(No Model.)
J. R. WILLIAMS.
MACHINE FOR CUTTING BLANKS.
No. 287,073. Patented Oct. 23, 1883.
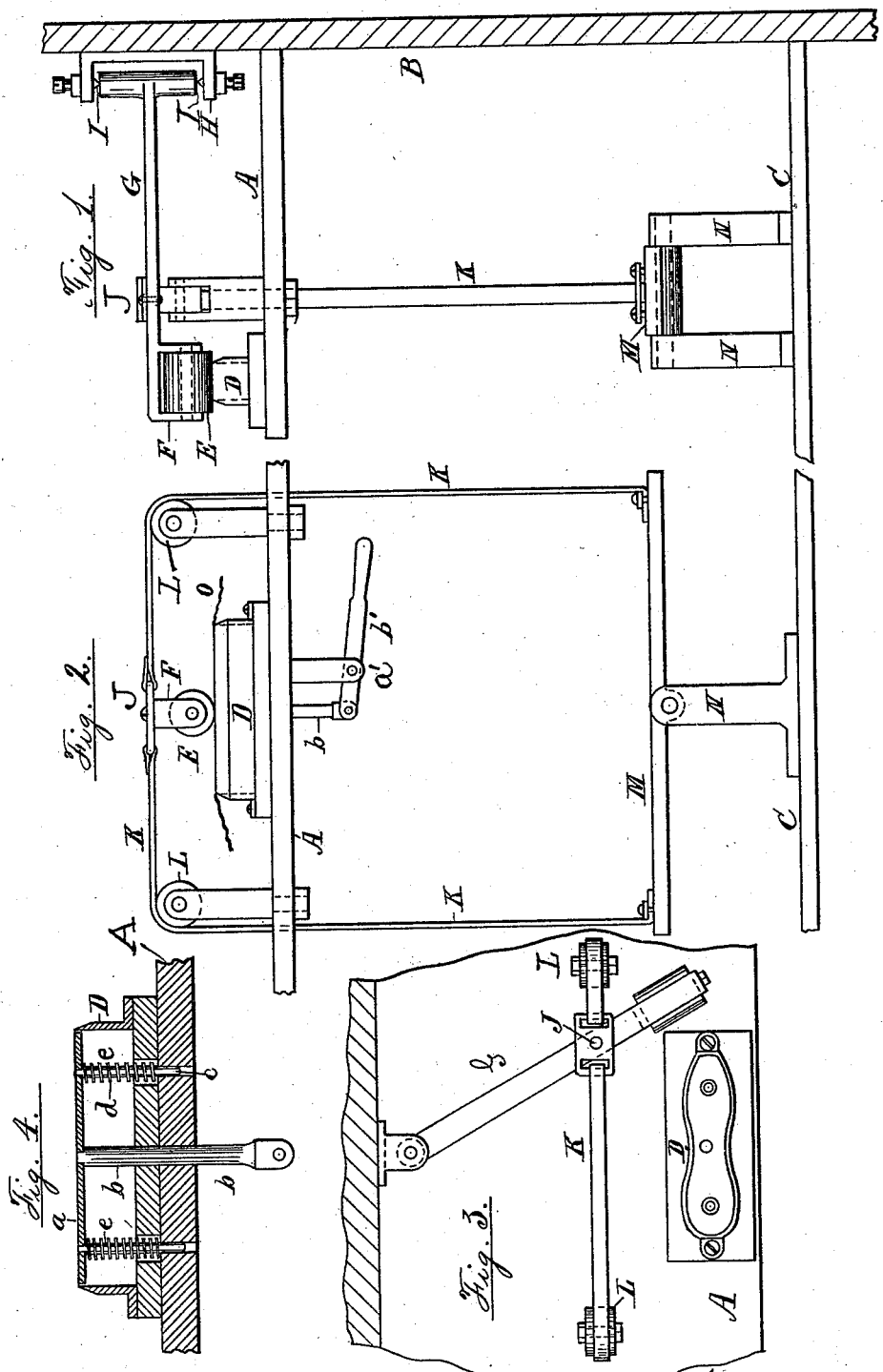
Attest:
H. N. Fremor
W. H. D. Crane.
Inventor.
John R. Williams, per
Thos. S. Crane, Atty.

UNITED STATES PATENT OFFICE.

JOHN R. WILLIAMS, OF NEWARK, NEW JERSEY.

MACHINE FOR CUTTING BLANKS.

SPECIFICATION forming part of Letters Patent No. 287,073, dated October 23, 1883.

Application filed February 10, 1883. (No model.)

*To all whom it may concern:*

Be it known that I, JOHN R. WILLIAMS, a citizen of the United States, residing in the city of Newark, in the county of Essex and State of New Jersey, have invented certain new and useful Improvements in Machines for Cutting Blanks, fully described and represented in the following specification and the accompanying drawings, forming a part of the same.

In the drawings, Figure 1 is an end view of part of a work-bench projecting from a wall and sustaining the cutter and roller operating mechanism. Fig. 2 is a front view of the parts shown in Fig. 1, and Fig. 3 is a plan of the same. Fig. 4 is a longitudinal sectional view of the cutter constructed with an interior pusher or platen, sustaining-springs, and a moving rod.

A is the work-bench; B, the wall to which it is attached; C, the floor; D, the cutter inverted upon the bench; E, the roller supported in ears F upon a swinging arm, G, the said arm being pivoted to a bracket, H, upon conical centers I I, the bracket being fastened to the wall and the arm vertically adjustable to swing in proper contact with the face of the cutter. One means for operating said roller and its supporting-arm is shown in the drawings, and others may be devised to suit the convenience of the operator for any particular class of work to which the cutter and roller may be adapted. The arm is provided with a pivoted buckle, J, between its fulcrum I and the roller, and straps K are connected to opposite sides or ends of the buckle, and are passed over rollers L, supported upon the bench A, and connected to opposite ends of a treadle, M, which is pivoted upon the stand N upon the floor C. The roller in Fig. 2 is shown resting upon the middle of the cutter, while in Fig. 3 it is shown standing near the right-hand end of the same, in readiness to be used. It is obvious that pressure upon the opposite ends of the treadle will move the roller in opposite directions, and that its contact with the edges of the cutter will serve to sever or cut any material that may be laid or held thereon, as at O in Fig. 2, where the material is shown on the cutter. Such cutting mechanism is therefore adapted for cutting out parts of leather shoes, corsets, clothing, cigar-wrappers, and fabrics of any kind into blanks of whatever form may be given to the cutter; and it is obvious that the force required to cut out such blanks is materially less under the operation of such a rolling-presser than when the whole cutter is impressed upon the fabric at once. If the cutter used has an inclosed cavity, as in the case of the sole-cutter shown in Fig. 3, the blanks will obviously fall inside of the same, and may be permitted to pass through the bench to the floor, or to a receptacle provided to catch and retain them, or they may be retained in the cutter until a specified number have accumulated, and then be expelled by a platen provided with a handle for moving it, as shown in Fig. 4. In this figure the cutter D is shown provided with a platen, *a*, mounted upon two rods, *d*, and provided with a spindle, *b*, by which it can be moved at pleasure. The spindle is passed through the work-bench A, and is shown in Fig. 2 provided with the hand-lever *b'* at its lower end, the lever being pivoted to the bench at *a'*, and being operated by the workman to expel the blanks from the cutter when the same is filled or contains the requisite number. To support the fabric or substance upon the top of the cutter before it is cut, the platen may be pressed upward by springs *e*, adapted merely to support its weight, and the material will thus be supported until the roller passes over it, when the springs yield and permit the blank to enter within the cutter and rest there until expelled by pushing the platen upward. The cutter and platen may be used without the springs by permitting the platen to lie in the bottom of the cutter while the blanks accumulate above it.

From the above description it will be seen that this invention is especially applicable to the cutting of delicate fabrics or substances, as the operator can hold the same in contact with the surface of the cutter by his hands, while the roller is moved over it by the action of his feet entirely. By the arrangement of the parts the operator has thus especial facilities afforded him for applying particular parts of the material—as a side of morocco or a tobacco-leaf—to the cutting-edges, and for subjecting it to a suitable tension while the roller passes over it. The material can thus be held stretched during the cutting operation, and the edges be kept free from the nicks and irregularities produced by puckers and wrinkles in the material.

It is thus obvious that the essential feature of my invention is the combination of the cutter, the treadle, and suitable connections with the roller and its supporting mechanism, so as to operate the roller without any aid from the operator's hands. The roller may therefore be mounted upon a rectilinear slide over the cutter, and may be traversed back and forth by the straps K, or any equivalent connections with the treadle, the same effects being produced as by the swinging arm G. The use of the arm G, however, affords a special facility for adjusting the roller to the face of the cutter by means of the conical centers I I, which are vertically adjustable in the bracket H, and can be set to press the roller more or less upon the cutter, as may be required.

I am fully aware that I cannot claim the combination of a roller and cutter such as I have shown herein, a patent therefor having been granted to R. Appleby, April 8, 1873, and my claims are therefore limited to the means I have devised.

What I claim is—

1. The combination, with the cutter D, of the roller E, a carrier for moving the said roller to and fro in contact with the surface of the cutter, treadle M, and suitable mechanism connecting said treadle with the carrier, as set forth.

2. The combination, with the cutter D, of the roller E, the supporting-arm G, mounted upon adjustable pivots, treadle M, straps K, and rollers L, substantially as shown and described.

In testimony whereof I have hereunto set my hand in the presence of two subscribing witnesses.

JNO. R. WILLIAMS.

Witnesses:
THOS. S. CRANE,
W. F. D. CRANE.